United States Patent
Williams et al.

(10) Patent No.: US 10,161,776 B2
(45) Date of Patent: Dec. 25, 2018

(54) METHOD FOR EQUIPPING A CORIOLIS MASS FLOWMETER WITH ELECTRIC CONNECTIONS

(71) Applicant: Krohne AG, Basel (CH)

(72) Inventors: Alan Williams, Bedfordshire (GB); James Blackmore, Wollaston (GB)

(73) Assignee: KROHNE AG, Basel (CH)

(*) Notice: Subject to any disclaimer, the term of this patent is extended or adjusted under 35 U.S.C. 154(b) by 21 days.

(21) Appl. No.: 15/455,352

(22) Filed: Mar. 10, 2017

(65) Prior Publication Data

US 2017/0261360 A1   Sep. 14, 2017

(30) Foreign Application Priority Data

Mar. 11, 2016 (DE) .......... 10 2016 104 551

(51) Int. Cl.
*G01F 1/84* (2006.01)

(52) U.S. Cl.
CPC .......... *G01F 1/8404* (2013.01); *G01F 1/8409* (2013.01); *G01F 1/849* (2013.01); *G01F 1/8495* (2013.01)

(58) Field of Classification Search
CPC .............. G01F 1/84; G01P 9/04; G01C 19/56
See application file for complete search history.

(56) References Cited

U.S. PATENT DOCUMENTS

| | | | |
|---|---|---|---|
| 4,507,975 A * | 4/1985 | Bittner | G01F 1/584 73/861.12 |
| 4,716,649 A | 1/1988 | Bittner et al. | |
| 5,337,607 A * | 8/1994 | Brown | G01F 1/58 29/595 |
| 6,944,931 B2 * | 9/2005 | Shcheglov | B81C 3/001 216/65 |
| 7,658,116 B2 | 2/2010 | Rieder et al. | |
| 7,694,563 B2 * | 4/2010 | Durante | G01C 19/5712 73/504.04 |
| 7,895,905 B2 * | 3/2011 | Lammerink | G01F 1/6845 73/861.355 |
| 8,978,473 B2 * | 3/2015 | Le Traon | G01C 19/5614 73/504.16 |
| 9,137,895 B2 * | 9/2015 | Fontana | B01L 3/502707 |
| 9,429,458 B2 * | 8/2016 | Hussain | G01F 1/8427 |
| 9,897,473 B2 * | 2/2018 | Braun | G01F 1/8431 |
| 2010/0077865 A1 | 4/2010 | Rackebrandt et al. | |

FOREIGN PATENT DOCUMENTS

| | | |
|---|---|---|
| DE | 298 20 498 U1 | 2/1999 |
| JP | 9-250940 A | 9/1997 |

* cited by examiner

*Primary Examiner* — Jewel V Dowtin
(74) *Attorney, Agent, or Firm* — David S. Safran; Roberts Mlotkowski Safran Cole & Calderon, P.C.

(57) ABSTRACT

A method (1) for at least partially equipping a Coriolis mass flowmeter (2) with electric connections (3), wherein the Coriolis mass flowmeter (2) at least has at least one measuring tube (5a, 5b), at least one actuator receptacle (6a, 6b) attached to the measuring tube (5a, 5b) and at least one sensor receptacle (7a-7d) attached to the measuring tube (5a, 5b) as structural parts and such a Coriolis mass flowmeter (2) can be implemented for achieving smaller production tolerances, higher accuracy and reliability in production and operation in that the electric connections (3) are applied on at least one structural part of the Coriolis mass flowmeter (2) by means of a mechanical printing method.

7 Claims, 3 Drawing Sheets

METHOD FOR EQUIPPING A CORIOLIS MASS FLOWMETER WITH ELECTRIC CONNECTIONS

BACKGROUND OF THE INVENTION

Field of the Invention

The invention relates to a method for at least partially equipping a Coriolis mass flowmeter with electric connections, wherein the Coriolis mass flowmeter at least has at least one measuring tube, at least one actuator receptacle attached to the measuring tube and at least one sensor receptacle attached to the measuring tube as structural parts. Furthermore, the invention also relates to a Coriolis mass flowmeter with structural parts, at least comprising at least one measuring tube, at least one actuator receptacle attached to the measuring tube and at least one sensor receptacle attached to the measuring tube, as well as having electric connections connected to the measuring tube.

Description of Related Art

Coriolis mass flowmeters of the type described above and, in this respect, also methods for producing such Coriolis mass flowmeters or equipping such Coriolis mass flowmeters with electric connections have been well known from the prior art for several decades. In addition to the undoubtedly most basic structural part, the measuring tube, Coriolis mass flowmeters often have other structural parts, for example connecting flanges at the input and output ends of the measuring tube, a housing for protecting the measuring tube and evaluating electronics in conjunction with the measuring tube and often reinforcing ribs between the measuring tube flanges in order to provide the necessary mechanical stability for the Coriolis mass flowmeter, also when installing in the process.

The measuring tube is excited to oscillation during operation of the measuring device, wherein the excitation is often carried out in the fundamental oscillation mode in the eigenfrequency by means of an actuator located it the actuator receptacle. The input and output side oscillations of the measuring tube in the second oscillation mode are detected as measuring variables, wherein the phase difference between the input and output side oscillation represents a measure for the mass flow. The detected oscillations have only a very small amplitude. In homogeneous media, accuracies of about 0.04% from the measured value can be achieved with high quality Coriolis mass flowmeters, which demonstrates that it is necessary to work with meticulous precision in production, calibration and operation of Coriolis mass flowmeters and that it is necessary to strive to minimize possible interfering effects, non-reproducible boundary conditions and production tolerances in all respects.

SUMMARY OF THE INVENTION

With that in mind, the object of the present invention is to provide a method for equipping a Coriolis mass flowmeter with electric connections, with which production tolerances can be minimized and the Coriolis mass flowmeter can, as a result, be produced and operated with more accuracy and reliability.

The above derived and described object is achieved initially with the method described in the introduction in that the electric connections are applied on at least one structural part of the Coriolis mass flowmeter by means of a mechanical printing method.

The invention is based on the knowledge that possibilities for improvement exist especially in the area of cabling and electrification of the different electric components of a Coriolis mass flowmeter. On the one hand, this is because the electric connections in a Coriolis mass flowmeter, for example the connections to the actuators and sensors on the measuring tube of the Coriolis mass flowmeter, are implemented with cables that are usually mounted by hand. For this, the cables are guided over the structural parts of the Coriolis mass flowmeter and attached to the structural parts—and thus also the measuring tube—by means of adhesion. Due to the manual application of the cabling, it is natural that there are discrepancies in the cabling, discrepancies in the amount of material used and, thus, in the applied mass, which relates both to the cable and the connection means, with which the cable is attached to the structural parts. Fixing the cable on the structural parts is often carried out in the prior art with tape or using adhesive points that are applied to the cable to be fixed at a small distance to one another—for example, at a distance of a few millimeters—and that come into contact with the measuring tube on the side of the cable, so that the cable is fixed.

Influencing the measuring tube and, thus, the motion dynamics of the measuring tube is noticeable. In this manner, the application of the cable to the measuring tube can definitely noticeably affect the zero point of the mass flow measurement.

In the production of the electric connection according to the invention using a mechanical printing method onto a structural part of the Coriolis mass flowmeter, the proneness of error associated with manual application is initially avoided and very high repeatability is achieved in the implementation of the electric connections. The repeatability relates to the geometric course of the electric connections on the structural parts, the applied mass on the structural parts and also the electric characteristics of the electric connections, such as, for example, the resistance between the starting point and the end point on the electric connection.

Basically, all printing methods come into question, with which conductive materials can be applied to a substrate. In suitable printing methods, for example, electrically conductive, fluid or pasty substances are printed onto the structural parts by means of a button that is used for exact dosage of substances. The mechanical printing method is preferably carried out supported by robots in the production line of Coriolis mass flowmeters, in which the structural parts have a well-defined position and the button can apply the conductive substance with high accuracy. Possible mechanical printing methods are methods of the type ink printing or, for example, also of the type aerosol jet printing; screen printing is also possible. It is also possible to use mechanical printing technologies, in which, for example, a non-conductive or only low conductive plastic is applied to the structural part, wherein the electric connections are produced by activating certain areas of the plastic by means of a laser and by subsequential stronger metallization. These technologies are also associated in part with 3-D printing.

According to a further development of the proposed method, it is provided that an electrically insulating coating is applied on the structural part and the electric connections are printed on the electrically insulating coating. This is, in particular, advantageous when the structural part itself is electrically conductive.

According to another further development of the invention, it is provided that the printed electric connections are covered at least partially with an electrically insulating cover layer. This insulating cover layer can also be generated by means of the mechanical printing method. This measure is used, on the one hand, for protecting the electric connections, however, on the other hand, it is also used for ensuring electric device safety. The electrically insulating layer can also be required for fulfilling certain requirements of explosion protection.

An advantageous implementation of the method is wherein the end points, or respectively the starting point and the end points of the printed electric connections are designed with an extensive surface, so that they are useful for attaching metallic lines by means of a joining method. As metallic line, in particular, wires are possible that lead to electric modules, such as drives, motion sensors or evaluation units. In particular, thermal joining methods such as soldering or welding come into question as joining method. In a particular implementation of the invention, it is provided that the end points with extensive surface of the electric connections also have a greater layer thickness than the printed conducting paths in order to be able to deal with the mechanical and thermal loads of the used joining method without damage.

It is of particular advantage when the measuring tube as structural part of the Coriolis mass flowmeter is provided with electric connections by means of printing. Since the measuring tube is the actual sensor of the Coriolis mass flowmeter, it is of particular advantage here when only a small as possible mechanical influence accompanies the electric connections, which is ensured in the print related implementation of the electric connections with a mechanical printing method.

In printing electric connections on the measuring tube as a structural part, it has been seen as particularly advantageous that the electric connections are applied on the measuring tube from a starting point to an end point according to at least one of the following variations by means of a mechanical printing method:

between the actuator receptacle and one of the sensor receptacles,
in the presence of two sensor receptacles, between the two sensor receptacles,
in the presence of at least one node plate on the end side of the tube, between the sensor receptacle and the node plate,
in the presence of two node plates on the end side of the tube, between the node plates.

In an advantageous implementation of the printing of the measuring tube with electric connections, it is provided that such electric connections, which are used for power supply of electric or electronic components of the Coriolis mass flowmeter or for transmitting signals (measuring signals, control signals), are guided on the measuring tube via tracks having minimum expansion or compression. This is advantageous because the electric connections are mechanically stressed the least in this way. Tracks having minimum expansion or compression can be determined, for example, illustratively using numerical simulation methods (finite elements, boundary).

In a further implementation of the method, the electric connections are printed on areas of interest as strain gauges, in particular in the form of meandering conducting paths. Thereby, the conducting paths are aligned in the direction, in which a respective expansion or compression is to be determined by measurement, since the greatest resistance change is set in this manner.

In a further advantageous implementation of the method, the electric connections are printed on areas of interest as thermal resistances, i.e., in particular, using a material with a constant as possible resistance coefficient.

The implementation of strain gauges or thermal resistances on the measuring tube using a printing method is a particularly fine solution, since the attachment of sensor elements designed as components always entails the difficulties of attachment.

The above derived object is achieved with the Coriolis mass flowmeter described in the introduction having the structural parts dealt with multiply above in that the electric connections are applied to at least one structural part of the Coriolis mass flowmeter by means of a mechanical printing method.

In detail, there is a plurality of possibilities for further developing the method for equipping a Coriolis mass flowmeter with electric connections and a respective Coriolis mass flowmeter as will be apparent from the following detailed description and the accompanying drawings.

DETAILED DESCRIPTION OF THE INVENTION

A method 1 for equipping a Coriolis mass flowmeter 2 with electrical connections 3 as well as a Coriolis mass flowmeter equipped in this manner is illustrated overall in the figures.

Figure 1:
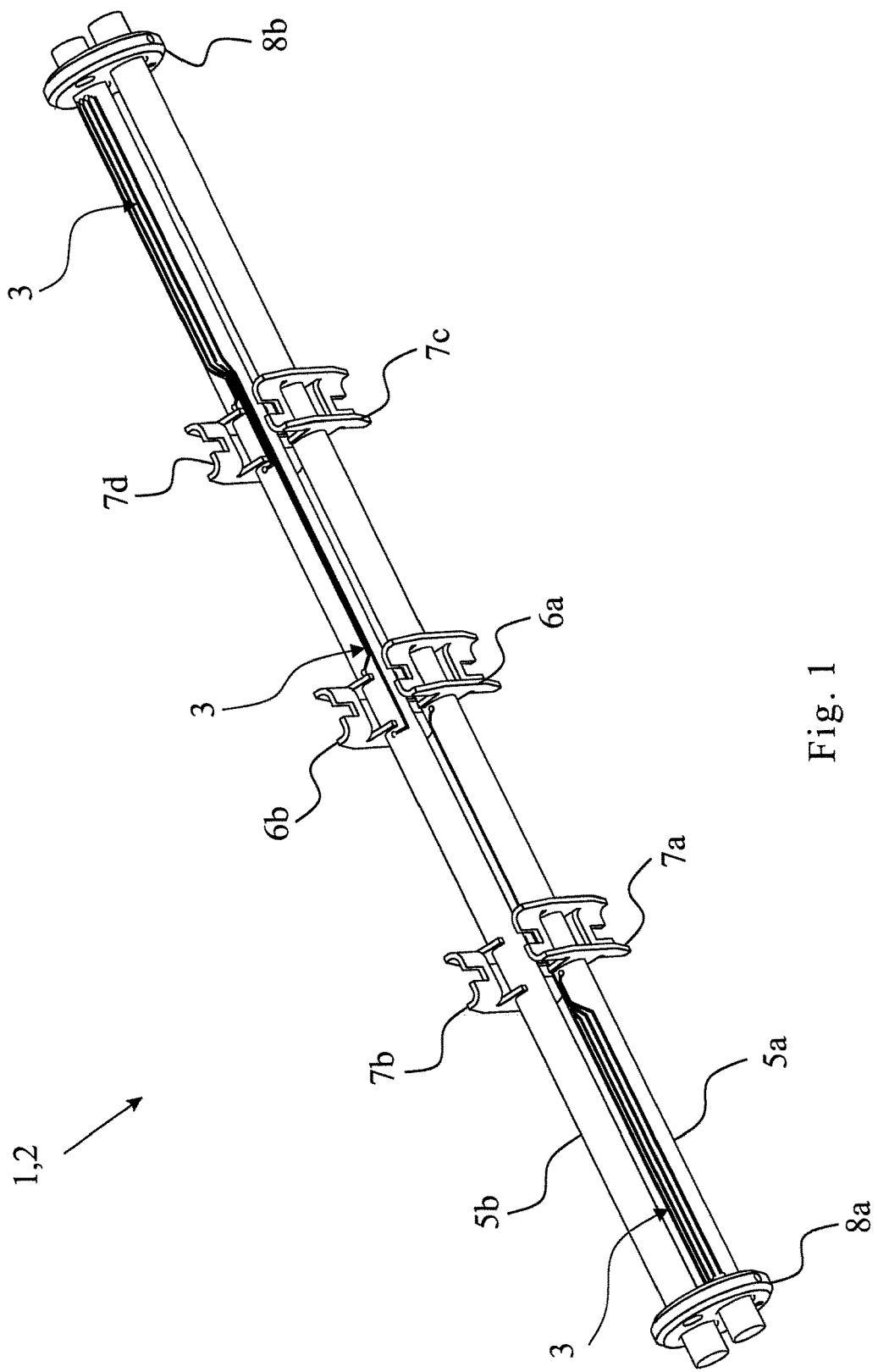
FIG. 1 is a Coriolis mass flowmeter equipped using a method according to the invention having electric connections applied by means of a mechanical printing method.

The illustrated Coriolis mass flowmeter 2, at least in the most complete form, in FIG. 1 has several structural parts, including two parallel running, measuring tubes 5a, 5b, actuator receptacles 6a, 6b attached to the measuring tubes 5a, 5b and sensor receptacles 7a-7d attached to the measuring tubes 5a, 5b, on an input side, and on an output side, the two Coriolis measuring tubes 5a, 5b are held by two node plates 8a, 8b. Coriolis mass flowmeters 2 can, of course, have a plurality of further structural parts, which are not shown here. This, however, is not of importance, since the principle being introduced here for equipping the Coriolis mass flowmeter 2 with electric connections 3 can be easily understood overall and transferred to other structural parts.

Figure 2:
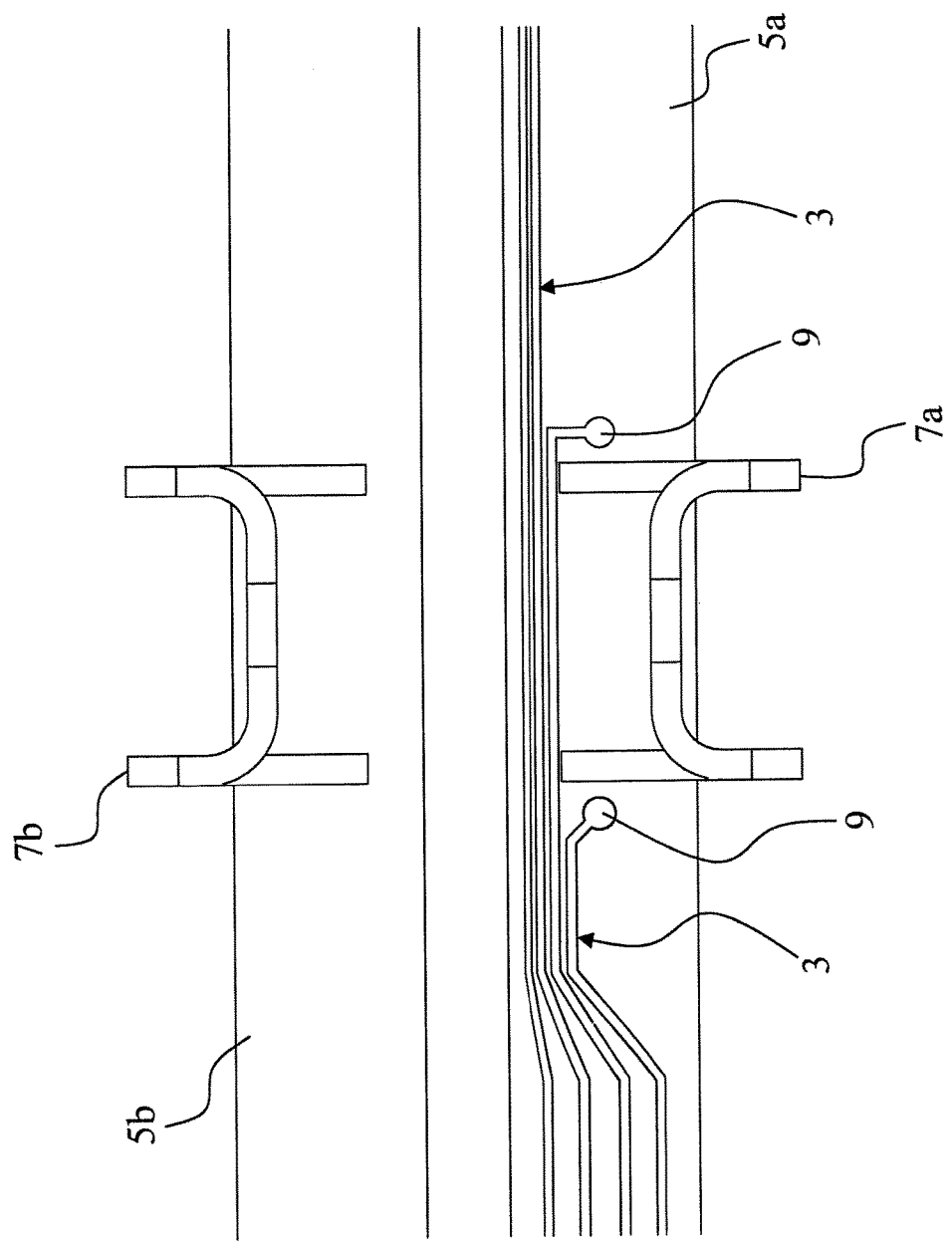
FIG. 2 is a detailed view of the end point of the electric connections applied by means of a mechanical printing method and FIG. 3 is a meandering structure of conducting paths as a strain gauge applied by means of a mechanical printing method.
Figure 3:
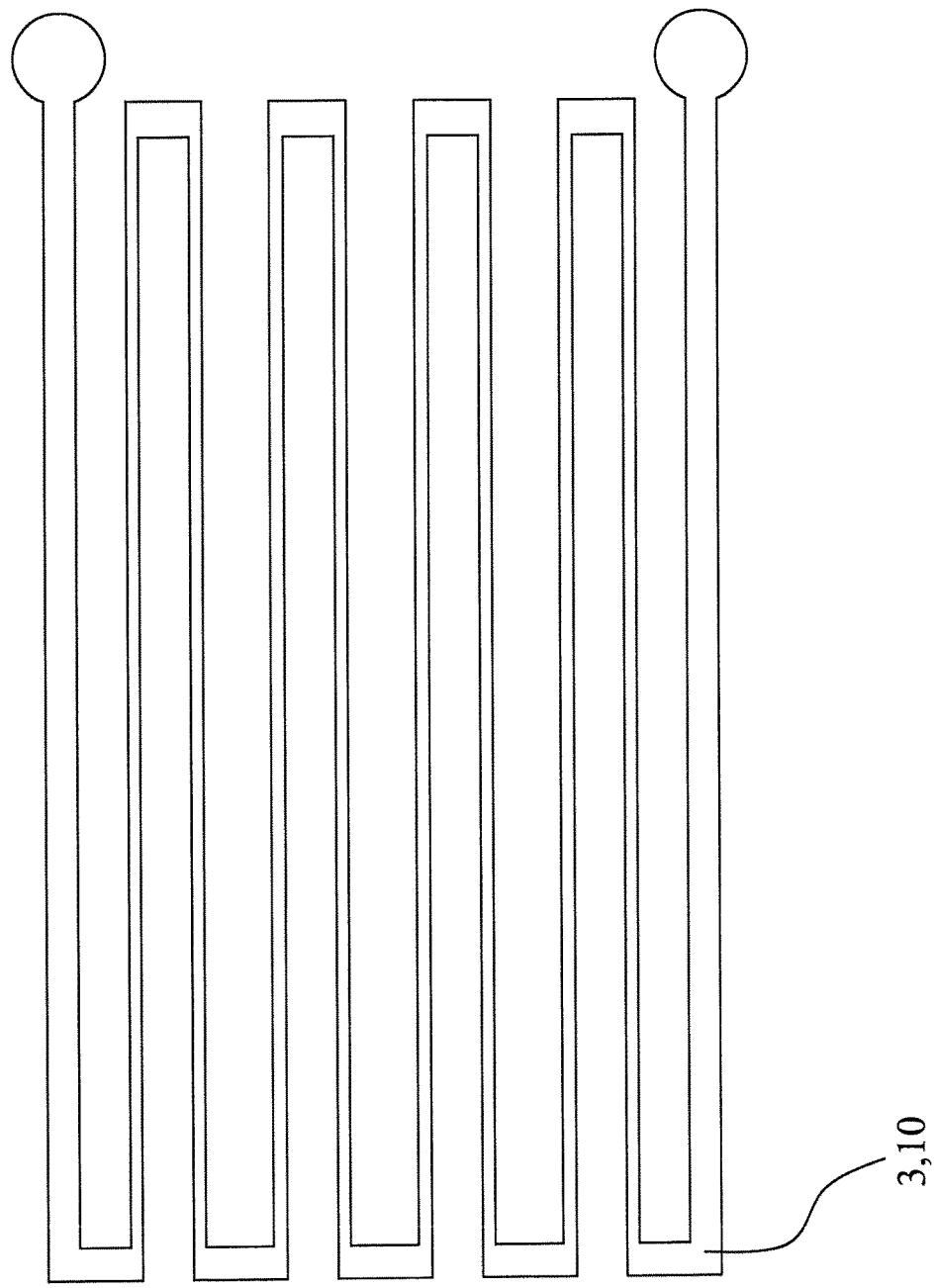

The electrical connections 3 illustrated in FIGS. 1 to 3 are all applied to the measuring tube 5a, 5b as structural part of the Coriolis mass flowmeter using a mechanical printing method—in the present case by means of aerosol jet printing.

Before the electric connections 3 are applied, an electrically insulating coating is applied to the measuring tube 5a, 5b, which is not shown separately here. The electric connections 3 are further also coated with an electrically insulating cover layer for protecting the conducting paths 3 as well as for ensuring device safety. The electric connections are accordingly "packaged" to be electrically insulated in the shown embodiments.

It can be easily seen that the very precise, repeatable and filigree implementation of the electric connections 3 by means of a mechanical printing method leads to a clearly lower influence of the measuring tubes 5a, 5b than, for example, cables guided on the measuring tubes 5a, 5b that have been attached using tape or adhesive points on the surface of the measuring tubes 5a, 5b.

It can be seen in FIG. 2 that the end points 9 of the electric connections 3 have been designed with an extensive surface, so that they are suitable for attaching wires—for example, by means of soldering. The wires that can be attached to the end points 9, which are not shown here, are then, for example, guided to the connections of an oscillation sensor that is attached in the sensor receptacle 7a, 7b.

The perspective view of FIG. 1 shows how the electric connections 3 run on the measuring tubes 5a, 5b. In the shown implementation, the electric connections 3 applied by means of a mechanical printing method run between the actuator receptacle 6a, 6b and one of the sensor receptacles 7a-7d. The end points of all electric connections 3 are located adjacent to the node plates 8a, 8b. From there, a further contact and possible cabling can take place.

FIG. 3 shows that the electric connections are printed as strain gauges, here in the form of meandering conducting paths 10. With the respective printing method, it is possible to print other functional components directly onto the structural elements of the Coriolis mass flowmeter 2.

What is claimed is:

1. A method for at least partially equipping a Coriolis mass flowmeter with electric connections, wherein the Coriolis mass flowmeter at least has at least one measuring tube, at least one actuator receptacle attached to the measuring tube and at least one sensor receptacle attached to the measuring tube as structural parts, the method comprising:
    applying the electric connections on at least one structural part of the Coriolis mass flowmeter by means of a mechanical printing method, and
    applying an electrically insulating coating to the structural part,
    wherein the electric connections are mechanically printed on the electrically insulating coating.

2. The method according to claim 1, wherein the mechanically printed electric connections are at least partially covered with an electrically insulating cover layer.

3. The method according to claim 1, wherein end points of the electric connections are formed with an expanded surface for attaching electric lines by means of a joining method.

4. A method for at least partially equipping a Coriolis mass flowmeter with electric connections, wherein the Coriolis mass flowmeter at least has at least one measuring tube, at least one actuator receptacle attached to the measuring tube and at least one sensor receptacle attached to the measuring tube as structural parts, the method comprising:
    applying the electric connections on at least one structural part of the Coriolis mass flowmeter by a mechanical printing method,
    wherein the electric connections are printed on the measuring tube as structural parts,
    wherein the electric connections on the measuring tube are applied from a starting point to an end point according to at least one of the following variations by means of the mechanical printing method:
        the mechanical printing being performed between the actuator receptacle and the at least sensor receptacle,
        wherein the at least sensor receptacle is two sensor receptacles, the mechanical printing being performed between the two sensor receptacles,
        at least one node plate being provided on an end of the tube, and the mechanical printing being performed between the sensor receptacle and the node plate,
        at least two node plates being provided on an end of the tube, and the mechanical printing being performed between the node plates.

5. The method according to claim 3, wherein electric connections for electrical power supply of components of the Coriolis mass flowmeter or for transmitting signals are guided on the measuring tube via tracks having a minimum expansion or compression.

6. The method according to claim 1, wherein the electric connections are printed as strain gauges having meandering conducting paths.

7. The method according to claim 1, wherein the electric connections are printed on as heating resistances.

* * * * *